(12) United States Patent
Wang

(10) Patent No.: US 11,583,979 B2
(45) Date of Patent: Feb. 21, 2023

(54) OPEN-CLOSE DEVICE

(71) Applicants: HANGZHOU GREAT STAR INDUSTRIAL CO., LTD., Hangzhou (CN); HANGZHOU GREAT STAR TOOLS CO., LTD., Hangzhou (CN)

(72) Inventor: Min Wang, Hangzhou (CN)

(73) Assignees: HANGZHOU GREAT STAR INDUSTRIAL CO., LTD., Hangzhou (CN); (2) HANGZHOU GREAT STAR TOOLS CO., LTD., Hangzhou (CN)

( * ) Notice: Subject to any disclaimer, the term of this patent is extended or adjusted under 35 U.S.C. 154(b) by 531 days.

(21) Appl. No.: 16/628,649

(22) PCT Filed: Apr. 28, 2017

(86) PCT No.: PCT/CN2017/082462
§ 371 (c)(1),
(2) Date: Jan. 3, 2020

(87) PCT Pub. No.: WO2018/195928
PCT Pub. Date: Nov. 1, 2018

(65) Prior Publication Data
US 2020/0353601 A1 Nov. 12, 2020

(51) Int. Cl.
*B25B 7/14* (2006.01)
*B23D 21/06* (2006.01)
(Continued)

(52) U.S. Cl.
CPC ............... *B25B 7/14* (2013.01); *B23D 21/06* (2013.01); *B25B 7/22* (2013.01); *B25B 7/12* (2013.01); *B26D 3/169* (2013.01)

(58) Field of Classification Search
CPC .... B25B 7/00; B25B 7/02; B25B 7/04; B25B 7/06; B25B 7/08; B25B 7/12; B25B 7/14;
(Continued)

(56) References Cited

U.S. PATENT DOCUMENTS 638,378 A * 12/1899 Casterlin .................. B25B 5/12
81/394
5,718,051 A 2/1998 Huang
(Continued)

FOREIGN PATENT DOCUMENTS

CN 1270093 A 8/2006
CN 101497192 * 8/2009
(Continued)

*Primary Examiner* — Robert J Scruggs
(74) *Attorney, Agent, or Firm* — William W. Cochran; Cochran Freund & Young LLC

(57) ABSTRACT

The present invention provides an open-close device, including a first member, a second member, a third member and a fourth member; the second member is rotatably connected to the first member, the third member is rotatably connected to the first member, the fourth member is rotatably connected to the second member and rotatably connected to the third member; the open-close device further includes an angle adjusting device which is provided at a joint between the third member and the first member, for adjusting the bending angle of the third member with respect to the first member.

17 Claims, 12 Drawing Sheets

(51) Int. Cl.
*B25B 7/22* (2006.01)
*B25B 7/12* (2006.01)
*B26D 3/16* (2006.01)

(58) Field of Classification Search
CPC .... B25B 7/16; B25B 7/18; B25B 7/22; B25B 17/02; B23D 21/06; B23D 21/10; B26D 3/16; B26D 3/169; B26D 3/118; B25G 1/06
See application file for complete search history.

(56) References Cited

U.S. PATENT DOCUMENTS

| | | | | |
|---|---|---|---|---|
| 2004/0000058 A1* | 1/2004 | Shyr | ......................... | A01G 3/02 |
| | | | | 30/261 |
| 2009/0007733 A1* | 1/2009 | Robinson | .................. | B25B 7/00 |
| | | | | 81/387 |
| 2011/0239833 A1* | 10/2011 | Hsieh | ......................... | B25B 7/18 |
| | | | | 81/177.8 |
| 2012/0096994 A1* | 4/2012 | Poole | ....................... | B26B 17/02 |
| | | | | 81/342 |

FOREIGN PATENT DOCUMENTS

| | | | |
|---|---|---|---|
| CN | 202910753 | | 5/2013 |
| CN | 203993592 | | 12/2014 |
| CN | 204546329 | | 8/2015 |
| CN | 201843894 | | 12/2015 |
| CN | 106141947 A | | 11/2016 |
| CN | 206550893 | | 10/2017 |
| DE | 29701450 | | 3/1997 |
| DE | 10113012 | * | 8/2002 |
| DE | 202009005131 | * | 11/2009 |
| WO | WO/2018/107399 | | 6/2019 |

* cited by examiner

OPEN-CLOSE DEVICE

This application is a continuation-in-part of U.S. patent application Ser. No. 16/469,563, "Open-Close Handheld Apparatus and Method of Adjustment of Angle between Handheld Portions Thereof" filed Jun. 13, 2019 by Min Wang, which is incorporated, herein, by reference for all that it discloses and teaches.

FIELD OF THE INVENTION

The present invention relates to the technical field of hand tools, and in particular, to a labor-saving open-close device capable of adjusting an angle of handheld portions.

DESCRIPTION OF THE PRIOR ART

The open-close device usually refers to a device which realizes a clamping or cutting function using lever principles, including various scissors, tweezers and pliers.

In the prior art, there are some labor-saving open-close devices, such as labor-saving pliers, whose opening angle at their handle-bars is adjustable to be much greater than that of conventional tool pliers, so as to realize labor-saving effects. However, the existing labor-saving open-close device has the disadvantages that it can only be used in regular occasions with relatively large operation spaces. In some special occasions with small operation spaces, they are not applicable due to long handheld portions of the open-close device. In the prior art, there are known some open-close devices capable of adjusting a bending angle of the handheld portions, such as pliers with bending handle-bars where a relative angle between the handheld portions and the clamping portion is adjustable, and the pliers is applicable to various occasions with relatively small spaces after the handheld portions are bent. However, the existing pliers with bending handle-bars do not have a labor-saving device, cannot realize labor-saving effects, and has bad user experience. In the specific application of the open-close device, there is a need for a labor-saving open-close device capable of adjusting an angle of handheld portions, such that it can be applied to special occasions with relatively small operation spaces, while realizing labor-saving effects.

SUMMARY OF THE INVENTION

The objective of the present invention is to provide an open-close device which solves the technical problems in the prior labor-saving open-close device of inconvenient use in narrow spaces and inconvenient adjustment of the bending angle of the handheld portions.

In order to solve the above technical problems, the present invention provides an open-close device, including a first member; a second member, rotatably connected to the first member; a third member, rotatably connected to the first member; and a fourth member, rotatably connected to the second member and rotatably connected to the third member. The open-close device further includes an angle adjusting device which is provided at a joint between the third member and the first member, for adjusting the bending angle of the third member with respect to the first member.

Further, in different embodiments, the first member successively includes a first clamping portion, a first rotating portion and a first gear shifting portion; the second member successively includes a second clamping portion disposed opposite to the first clamping portion, a second rotating portion which is rotatably connected to the first rotating portion by a first axle pin, and a second gear shifting portion disposed opposite to the first gear shifting portion.

Further, in different embodiments, the third member successively includes a first handheld portion, a third gear shifting portion and a third rotating portion; the fourth member successively includes a second handheld portion disposed opposite to the first handheld portion, a fourth gear shifting portion disposed opposite to the third gear shifting portion, and a fourth rotating portion which is rotatably connected to the third rotating portion by a second axle pin.

Further, in different embodiments, the open-close device further includes a third axle pin provided at a joint between the fourth member and the second member.

Further, in different embodiments, the angle adjusting device includes a first gear shifting portion and a third gear shifting portion; the first gear shifting portion includes a first clamping plate and a second clamping plate; a clamping plate gap is formed between the first clamping plate and the second clamping plate; the third gear shifting portion is inserted to the clamping plate gap.

Further, in different embodiments, the open-close device further includes another angle adjusting device which is provided at the joint between the fourth member and the second member, for adjusting the bending angle of the fourth member with respect to the second member.

Further, in different embodiments, the angle adjusting device includes a first gear shifting portion and a third gear shifting portion, or, includes a second gear shifting portion and a fourth gear shifting portion; the first gear shifting portion or the second gear shifting portion includes a first clamping plate and a second clamping plate; a clamping plate gap is formed between the first clamping plate and the second clamping plate; the third gear shifting portion or the fourth gear shifting portion is inserted to the clamping plate gap.

Further, in different embodiments, the first clamping plate is provided with a first gear slot recessed into an outer surface of the first clamping plate, two or more first gear holes penetrating through the bottom of the first gear slot, and at least one first communicating hole penetrating through the bottom of the first gear slot to communicate the two or more first gear holes; the second clamping plate is provided with a second gear slot recessed into an outer surface of the second clamping plate, two or more second gear holes penetrating through the bottom of the second gear slot, each second gear hole respectively corresponding to one first gear hole, and at least one second communicating hole penetrating through the bottom of the second gear slot to communicate the two or more second gear holes, in which the third gear shifting portion is provided with gear axle holes, corresponding to the first gear hole and the second gear hole.

Further, in different embodiments, the angle adjusting device further includes a gear shaft, successively inserted into the second gear hole, the gear axle hole and the first gear hole; and a press key fixedly connected to the gear shaft.

Further, in different embodiments, the gear shaft includes a gear shaft lever, a gear shaft base provided at one end of the gear shaft lever, corresponding to the second gear slot, and a gear shaft threaded groove recessed into the surface of the other end of the gear shaft lever; the press key includes a press plate corresponding to the first gear slot, and a press screw protruding from the surface of the press plate, and in threaded connection to the gear shaft threaded groove.

Further, in different embodiments, a width of the gear shaft lever is greater than that of the first communicating hole, and less than that of the second communicating hole; a width of the press screw is less than that of the first communicating hole.

Further, in different embodiments, the angle adjusting device further includes a compression spring, one end of which is tangent to a bottom surface of the first gear slot, and the other end of which is tangent to a surface of the press plate.

Further, in different embodiments, the angle adjusting device further includes an elastic sheet, one end of which is fixedly connected to the third member, and the other end of which is attached to the surface of the gear shaft base, or fixedly connected to the gear shaft base.

Further, in different embodiments, the elastic sheet includes an elastic sheet fixed portion fixedly connected to the first handheld portion by rivets, an elastic sheet pressure portion tangent to the surface of the gear shaft base, or fixedly connected to the gear shaft base, and an elastic sheet bending portion, one end of which is connected to the elastic sheet fixed portion, and the other end of which is connected to the elastic sheet pressure portion.

Further, in different embodiments, the first clamping plate is provided with two or more third gear holes penetrating through the first clamping plate, and at least one third communicating hole penetrating through the first clamping plate and communicating two or more third gear holes; the second clamping plate is provided with two or more fourth gear holes penetrating through the second clamping plate, each fourth gear hole respectively corresponding to one third gear hole, and at least one fourth communicating hole penetrating through the second clamping plate, to communicate two or more fourth gear holes; in which the third gear shifting portion is provided with gear shaft holes corresponding to the third gear hole and the fourth gear hole.

Further, in different embodiments, the angle adjusting device further includes a gear shaft successively inserted into the fourth gear hole, the gear shaft hole and the third gear hole; and a rotating key fixedly connected to the gear shaft.

Further, in different embodiments, the gear shaft includes a gear shaft lever, a gear shaft base provided at one end of the gear shaft lever and attached to the outer surface of the second clamping plate, and a rotating key mounting slot recessed into the surface of the other end of the gear shaft lever; the rotating key includes a knob attached to the outer surface of the first clamping plate, and a rotating key mounting stem fixedly mounted into the rotating key mounting slot.

Further, in different embodiments, the fourth gear hole is provided with at least one positioning notch at its inner side wall; the gear shaft lever includes a positioning slot recessed into an side wall of the gear shaft lever and corresponding to the second clamping plate; the positioning slot is successively therein outside-in provided with a positioning ball engaged into one positioning notch, and a positioning spring, whose one end is tangent to the positioning ball, and the other end is tangent to the bottom of the positioning slot.

Further, in different embodiments, a cross section of the gear shaft lever has a waist shape which refers to the shape of a circle with two symmetric arcs removed; the width of the widest part of the gear shaft lever corresponds to the diameter of the first gear hole and the second gear hole; the width of the narrowest part of the gear shaft lever corresponds to the width of the first communicating hole and the second communicating hole.

Further, in different embodiments, the open-close device includes, but, not limited to, scissors or pliers.

The present invention has the advantages that an open-close device is provided, the user can self-adjust the bending angle of the handheld portion(s) at one side or two sides of the open-close device with respect to the clamping portion as appropriate. In addition, the open-close device has the labor-saving effects at the same time. In the present invention, the free gear shifting can be realized by operating the angle adjusting device, such that the bending angle of the handheld portion(s) at one or two sides can be adjusted by the user himself or herself, so that the labor-saving open-close device can be widely used and is suitable for large-scale application.

Figure 1:
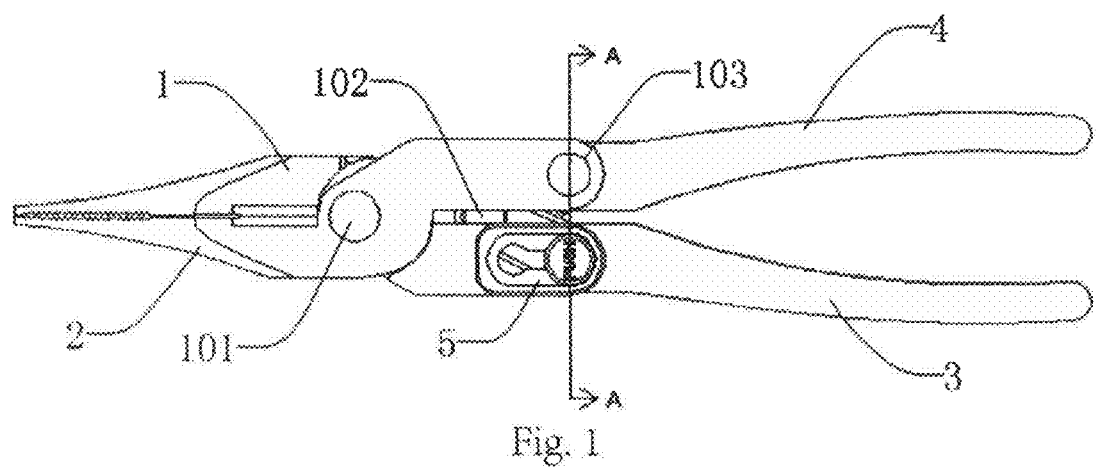
FIG. 1 is a front structural schematic diagram when the first embodiment of the present invention is in the first gear.

REFERENCE NUMERALS 1 first member, 2 second member, 3 third member, 4 fourth member, 5 angle adjusting device;
11 first clamping portion, 12 first rotating portion, 13 first gear shifting portion;
21 second clamping portion, 22 second rotating portion, 23 second gear shifting portion;
31 first handheld portion, 32 third rotating portion, 33 third gear shifting portion;
41 second handheld portion, 42 fourth rotating portion, 43 fourth gear shifting portion;
51 gear shaft, 52 press key, 53 compression spring, 54 elastic sheet, 55 rotating key;
101 first axle pin, 102 second axle pin, 103 third axle pin, 104 rivet;
131 first clamping plate, 132 second clamping plate, 133 clamping plate gap; 331 gear shaft hole;
511 gear shaft lever, 512 gear shaft base, 513 gear shaft threaded groove, 514 rotating key mounting slot;
521 press plate, 522 press screw;
541 elastic sheet fixed portion, 542 elastic sheet pressure portion, 543 elastic sheet bending portion;
551 knob, 552 rotating key fixing lever;
1311 first gear slot, 1312 first gear hole, 1313 first communicating hole, 1315 third gear hole, 1316 third communicating hole;
1321 second gear slot, 1322 second gear hole, 1323 second communicating hole, 1324 positioning notch, 1325 fourth gear hole, 1326 fourth communicating hole;
5111 positioning slot, 5112 positioning ball, 5113 positioning spring.

DETAILED DESCRIPTION OF THE PREFERRED EMBODIMENTS

The preferable embodiments of the present invention will be introduced below with reference to drawings of the specification to approve that the present invention can be implemented. The embodiment can fully introduce the present invention to persons skilled in the art, such that its technical contents are clearer and easier to understand. The present invention can be embodied by different embodiments in different forms. The protection scope of the present invention is not limited to the embodiments mentioned herein.

In the drawings, structure-like members are labeled with like reference numerals, and structure or function-similar members are labeled with similar reference numerals. The size and thickness of each member as shown in the drawings are shown arbitrarily. The present invention does not limit the size and thickness of each member.

Directional relative terms mentioned in the present invention, such as upper, lower, front, back, left, right, inside, outside, side, top, bottom, top end, bottom end, tail end and the like, are only the directions in the drawings, and are only used for explaining and describing the present invention, instead of limiting the protection scope of the present invention.

When some members are referred to as being "on" another member, they can be directly on the other member; or an intervening member may also be present, the member is placed on the intervening member and the intervening member is placed on the other member. When a member is referred to as being "mounted to" or "connected to" another element, it is understood as direct "mounting" or "connecting", or one member being indirectly "mounted to" or "connected to" another member by an intervening member.

First Embodiment

Figure 2:
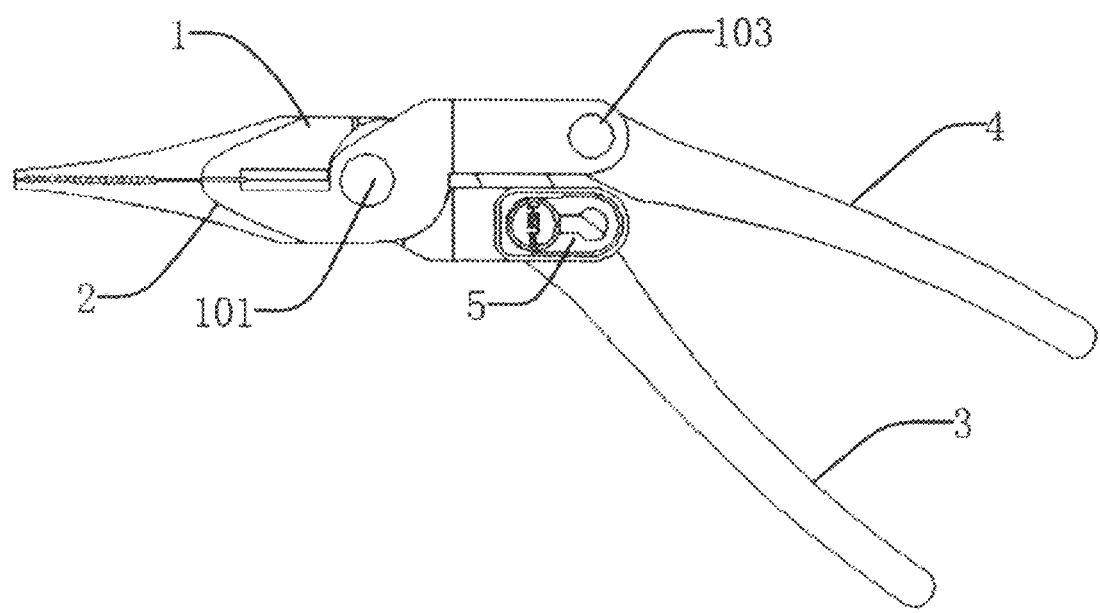
FIG. 2 is a front structural schematic diagram when the first embodiment of the present invention is in the second gear.
Figure 3:
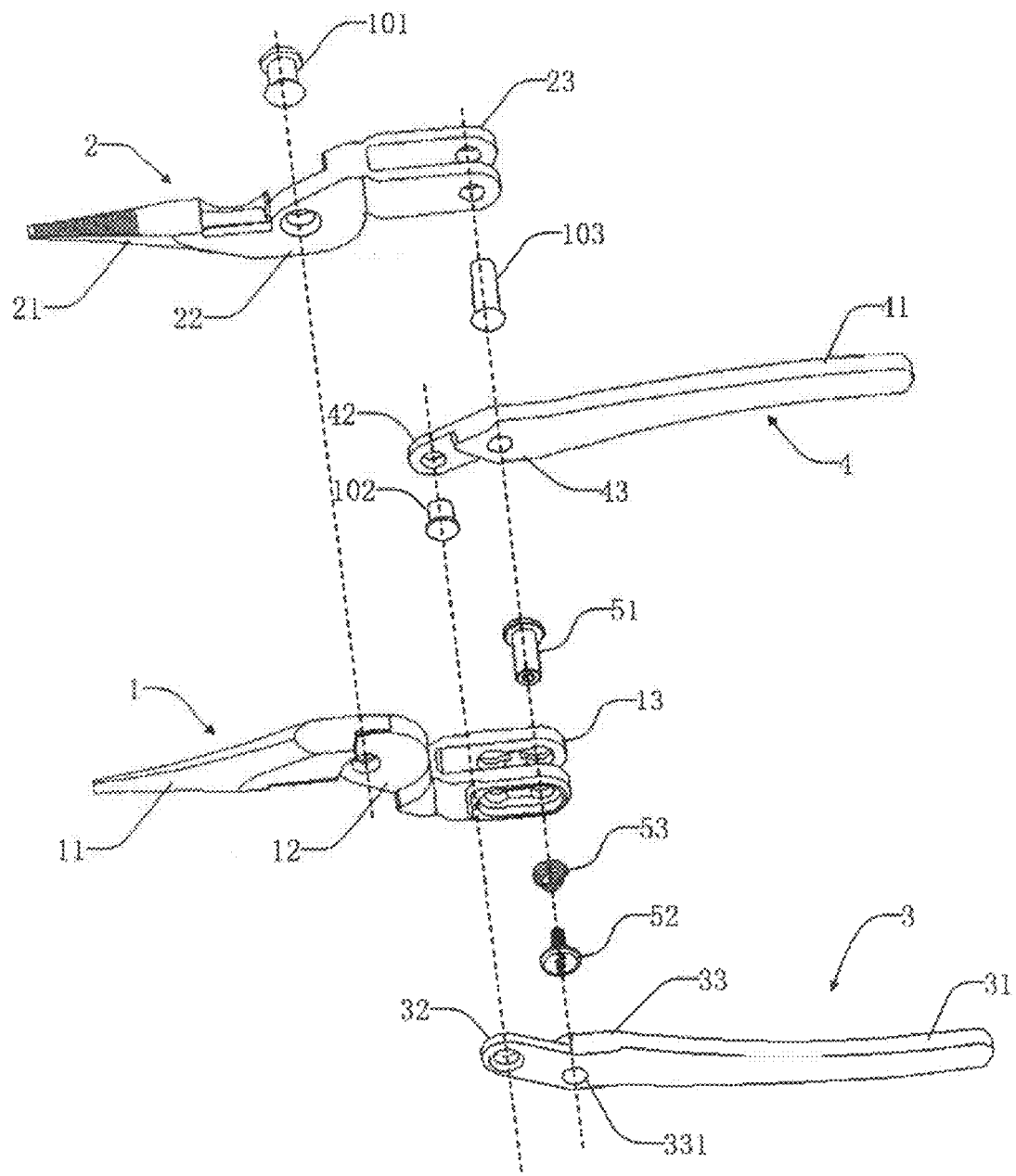
FIG. 3 is an exploded structural schematic diagram of the first embodiment of the present invention.

As shown in FIGS. 1-3, in the open-close device according to the present embodiment, the basic structure is similar to that of the existing labor-saving pliers, including, but not limited to scissors or pliers. The open-close device according to the present embodiment specifically includes a first member 1, a second member 2, a third member 3 and a fourth member 4. The middle portion of the second member 2 is rotatably connected to the middle portion of the first member 1, the middle portion of the third portion 3 is rotatably connected to the lower end of the first member 1, the middle portion of the fourth member 4 is rotatably connected to the lower end of the second member 2, and the upper end of the fourth member 4 is rotatably connected to the upper end of the third member 3.

The first member 1 successively includes a first clamping portion 11, a first rotating portion 12 and a first gear shifting portion 13; the second member 2 successively includes a second clamping portion 21, a second rotating portion 22 and a second gear shifting portion 23. The second clamping portion 21 is disposed opposite to the first clamping portion 11, a certain object can be clamped or cut between the second clamping portion 21 and the first clamping portion 11; the second rotating portion 22 is rotatably connected to the first rotating portion 12 by a first axle pin 101; the second gear shifting portion 23 is disposed opposite to the first gear shifting portion 13.

The third member 3 successively includes a first handheld portion 31, a third gear shifting portion 33 and a third rotating portion 32; the fourth member 4 successively includes a second handheld portion 41, a fourth gear shifting portion 43 and a fourth rotating portion 42. The second handheld portion 41 is disposed opposite to the first handheld portion 31, for hands to exert force; the fourth gear shifting portion 43 is disposed opposite to the third gear shifting portion 33; the fourth rotating portion 42 is rotatably connected to the third rotating portion 33 by the second axle pin 102. The largest opening angle formed by the first handheld portion 31 and the second handheld portion 41 is greater than that between the first clamping portion 11 and the second clamping portion 21, for the hands of the user to exert force, with labor-saving effects.

The open-close device of the present embodiment further includes an angle adjusting device 5 and a third axle pin 103. The angle adjusting device 5 is provided at a joint between the third member 3 and the first member 1, for adjusting the bending angle of the third member 3 with respect to the first member 1. The angle between the first handheld portion 31 and the first clamping portion 11 is adjustable as appropriate, so as to form a shape which makes the device operable in narrow spaces. The third axle pin 103 is provided at a joint between the fourth member 4 and the second member 2. When the third member 3 is bent with respect to the first member 1, since the top end of the third member 3 is rotatably connected with that of the fourth member 4, the fourth member 4 is also bent with respect to the second member 2.

The angle adjusting device 5 includes a first gear shifting portion 13 and a third gear shifting portion 33. The first gear shifting portion 13 includes a first clamping plate 131 and a second clamping plate 132 with a clamping plate gap 133 formed therebetween; the third gear shifting portion 33 is inserted into the clamping plate gap 133.

Figure 4:
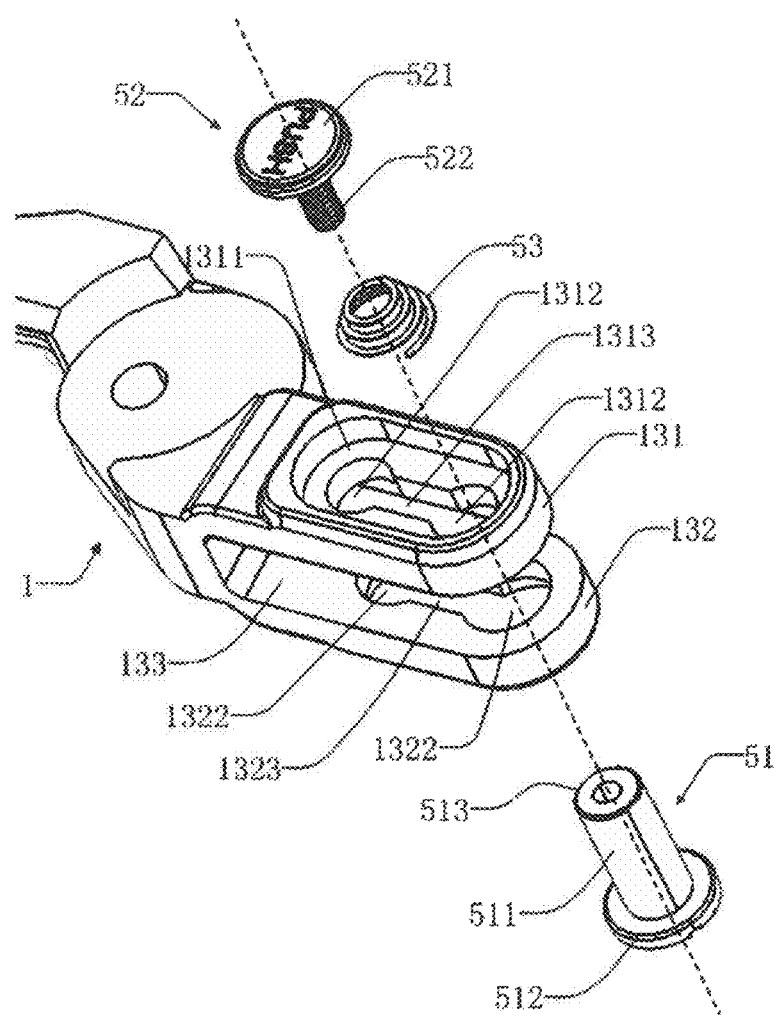
FIG. 4 is an exploded structural schematic diagram of the angle adjusting device in the first embodiment of the present invention.
Figure 5:
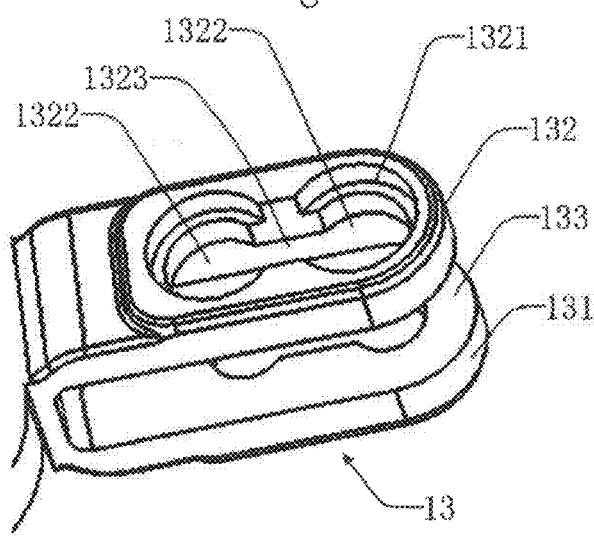
FIG. 5 is a back structural schematic diagram of the first gear shifting portion in the first embodiment of the present invention.

As shown in FIGS. 4-5, the first clamping plate 131 is provided with one first gear slot 1311, two first gear holes 1312 and one first communicating hole 1313. The first gear slot 1311 is recessed into the outer surface of the first clamping plate 131; the first gear hole 1312 penetrates through the bottom of the first gear slot 1311; the first communicating hole 1313 penetrates through the bottom of the first gear slot 1313, to communicate the two first gear holes 1312. The number of the first gear holes 1312 can also be three or more, the number of the first communicating holes 1313 can also be two or more, and each first communicating hole 1313 communicates with two adjacent first gear holes 1312.

The second clamping plate 132 is provided with a second gear slot 1321, two second gear holes 1322 and one second communicating hole 1323. The second gear slot 1321 is recessed into the outer surface of the second clamping plate 132; the second gear hole 1322 penetrates through the bottom of the second gear slot 1321; the second communicating hole 1323 penetrates through the bottom of the second gear slot 1321, to communicate the two second gear holes 1322. The number of the second gear holes 1322 can also be three or more, the number of the second communicating holes 1323 can also be two or more, and each second communicating hole 1323 communicates with two adjacent second gear holes 1322. A group of opposite first gear hole 1312 and second gear hole 1322 form a gear, and in the open-close device as shown in FIGS. 1-5, its angle adjusting device 5 has two gears.

The third gear shifting portion 33 is provided with a gear shaft hole 331, corresponding to the two or more gears. Specifically, each gear has one first gear hole 1312 and one second gear hole 1322.

As shown in FIGS. 4-7, the angle adjusting device 5 further includes a gear shaft 51 and a press key 52. The gear shaft 51 is successively inserted into the second gear hole 1322, the gear shaft hole 331 and the first gear hole 1312; the press key 52 is fixedly connected to the gear shaft 51.

The gear shaft 51 includes a gear shaft lever 511, a gear shaft base 512 and a gear shaft threaded groove 513. The gear shaft base 512 is provided at one end of the gear shaft lever 511, and corresponds to the second gear slot 1321. The gear shaft threaded groove 513 is recessed into the surface of the other end of the gear shaft lever 511.

The press key 52 includes a press plate 521 and a press screw 522. The press plate 521 corresponds to the first gear slot 1311, and the press screw 522 protrudes from the lower surface of the press plate 521, and is in threaded connection to the gear shaft threaded groove 513. The width of the first communicating hole 1313 is less than that of the second communicating hole 1323, the width of the gear shaft lever 511 is greater than that of the first communicating hole 1313 and is less than that of the second communicating hole 1323, and the width of the press screw 522 is less than that of the first communicating hole 1313.

The angle adjusting device 5 further includes a compression spring 53, one end of which is tangent to the bottom surface of the first gear slot 1311, and the other end is tangent to the lower surface of the press plate 521.

Figure 6:
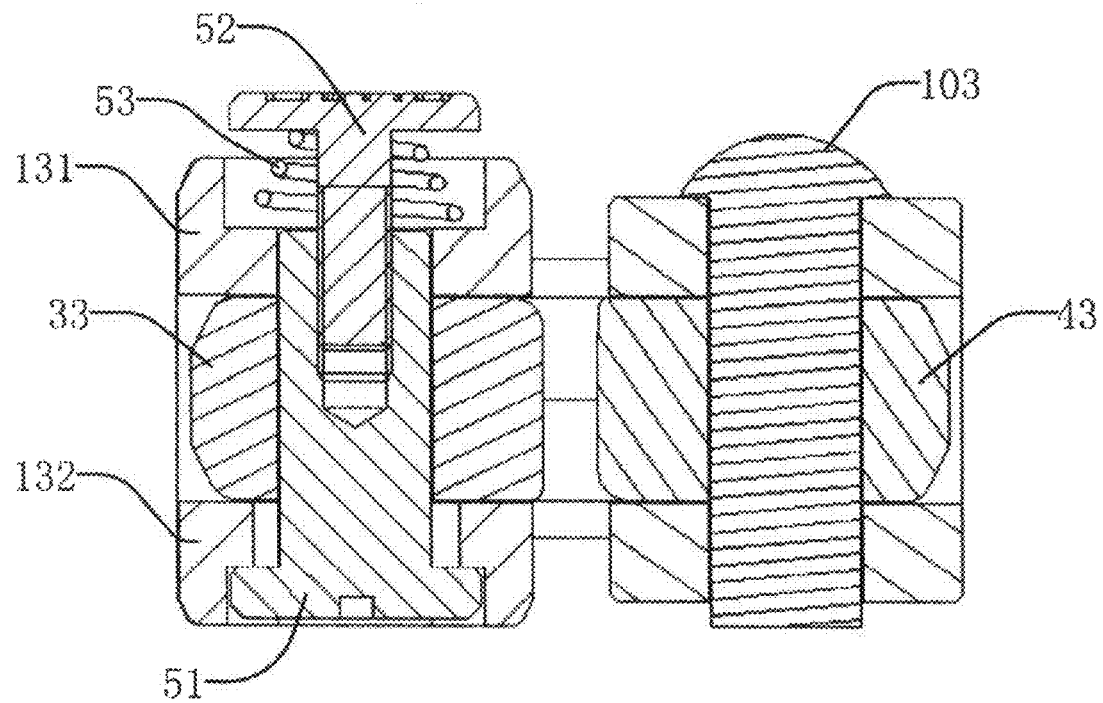
FIG. 6 is a sectional view of the press key in a released state taken along AA in FIG. 1.

As shown in FIGS. 1 and 6, when the angle adjusting device 5 is located in the first gear, the press plate 521 is supported by the compression spring 53, and located outside the first gear slot 1311; the gear shaft base 512 is engaged into the second gear slot 1321 in the first gear, and the lower surface of the gear shaft base 512 aligns with the lower surface of the second clamping plate 132. Since the width of the gear shaft lever 511 is greater than that of the first communicating hole 1313, the gear shaft lever 511 is locked by the first gear hole 1312 in the first gear.

Figure 7:
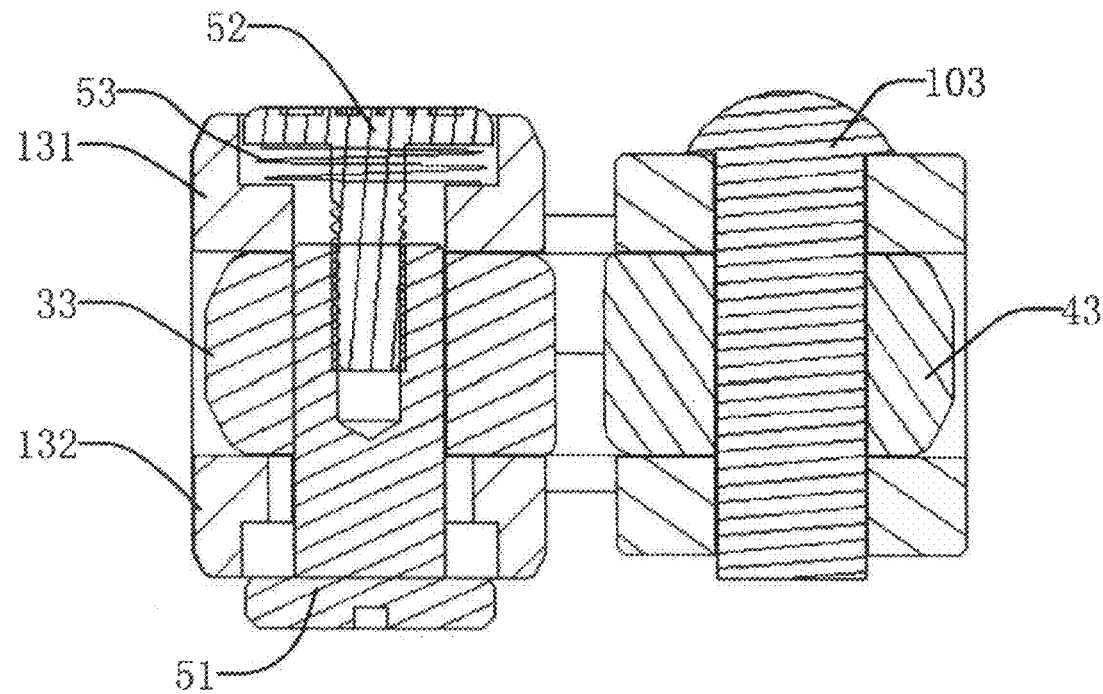
FIG. 7 is a sectional view of the press key in a pressed state taken along AA in FIG. 1.

As shown in FIG. 7, when the press plate 521 is pressed downwards, the compression spring 53 is compressed downwards, the press plate 521 is engaged into the first gear slot 1311, the gear shaft base 512 disengages from the second gear slot 1321, and the gear shaft lever 511 slides downwards, and disengages from the lock by the first gear hole 1312. Since the width of the gear shaft lever 511 is less than that of the second communicating hole 1323, the width of the press screw 522 is less than that of the first communicating hole 1313. After being unlocked, the gear shaft 51 can slide through the first communicating hole 1313 and the second communicating hole 1323.

As shown in FIG. 2, when the press plate 521 is stressed and slides, the gear shaft 51 slides from the first gear to the second gear, and the third member 3 is bent greatly with respect to the first member 1. Since the upper end of the fourth member 4 is rotatably connected to the upper end of the third member 3 by the second axle pin 102, the fourth member 4 less bends with respect to the second member 2. The third member 3 and the fourth member 4 both bend towards the same side.

When the press plate 521 is released, the compression spring 53 resiles, and the press plate 521 is supported by the compression spring 53, and disengages from the first gear slot 1311. The gear shaft base 512 is engaged into the second gear slot 1321, and the lower surface of the gear shaft base 512 aligns with the lower surface of the second clamping plate 132. At this point, the gear shaft lever 511 is located in the second gear; since the width of the gear shaft lever 511 is greater than that of the first communicating hole 1313, the gear shaft lever 511 is locked by the first gear hole 1312 in the second gear. At this point, the two clamping portions of the open-close device are in a closed state, with the handheld portions bent, the length of which is effectively shortened.

Then, the user opens the first handheld portion 31 and the second handheld portion 41 of the open-close device as appropriate. The first clamping portion 11 and the second clamping portion 21 are also opened, for clamping or cutting objects. When the open-close device is opened, its length is further shortened, for being applied in narrow operation spaces.

When the user uses the open-close device according to the present embodiment to clamp or cut objects, the two handheld portions are closed firstly, and then the press plate 521 is pressed again, or the two handheld portions are closed after the press plate 521 is pressed.

When the press plate 521 is pressed downwards, the compression spring 53 is compressed downwards, and the gear shaft lever 511 slides downwards to disengage from the lock by the first gear hole 1312 in the second gear. Since the width of the gear shaft lever 511 is less than that of the second communicating hole 1323, the width of the press screw 522 is less than that of the first communicating hole 1313. After being unlocked, the gear shaft 51 can slide to the first gear through the first communicating hole 1313 and the second communicating hole 1323.

When the press plate 521 is released, the compression spring 53 resiles, and the press plate 521 is supported by the compression spring 53, and disengages from the first gear slot 1311. The gear shaft base 512 is engaged into the second gear slot 1321, and the lower surface of the gear shaft base 512 aligns with the lower surface of the second clamping plate 132. At this point, since the width of the gear shaft lever 511 is greater than that of the first communicating hole 1313, the gear shaft lever 511 is locked by the first gear hole 1312 in the first gear.

The gear shaft base 512 is engaged into the second gear slot 1321, and the lower surface of the gear shaft base 512 aligns with the lower surface of the second clamping plate 132. At this point, the gear shaft lever 511 is located in the second gear; since the width of the gear shaft lever 511 is greater than that of the first communicating hole 1313, the gear shaft lever 511 is locked by the first gear hole 1312 in the second gear.

Figure 8:
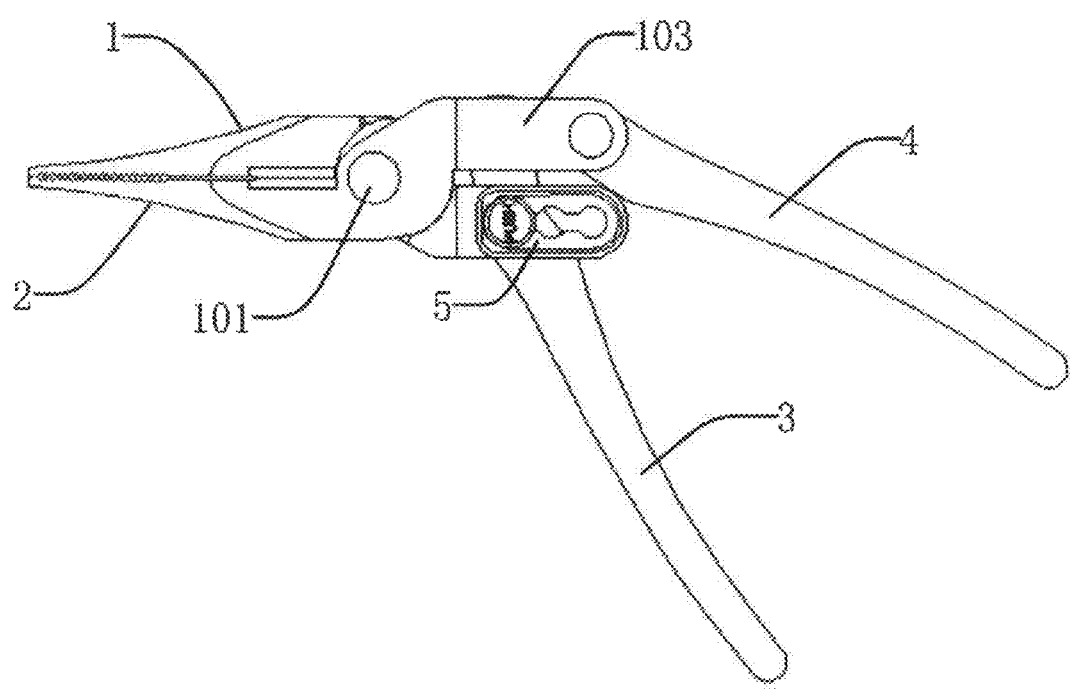
FIG. 8 is a front structural schematic diagram of another modification of the first embodiment of the present invention in the third gear.

As shown in FIG. 8, in the first embodiment, in the open-close device, its angle adjusting device 5 can also have three gears. The numbers of the first gear holes 1312 and the second gear holes 1322 are both three. The numbers of the first communicating holes 1313 and the second communicating holes 1323 are both two. Each second communicating hole 1323 communicates with two adjacent second gear holes 1322. Similarly, the angle adjusting device 5 can also have four, five or even more gears. There are plural first gear holes 1312 and second gear holes 1322 as well as plural first communicating holes 1313 and second communicating holes 1323.

Both of the multi-gear angle adjusting device and the foregoing two-gear angle adjusting device can directly adjust the bending angle of the third member 3 with respect to the first member 1, while they can drive the fourth member 4 to bend with respect to the second member 2. In contrast, during use of the multi-gear open-close device, the user can adjust the bending angle of the third member 3 with respect to the first member 1 as appropriate many times, such that the bending angle is greater, and the whole length is shorter, so as to realize the application in narrower operation spaces.

Second Embodiment

Figure 9:
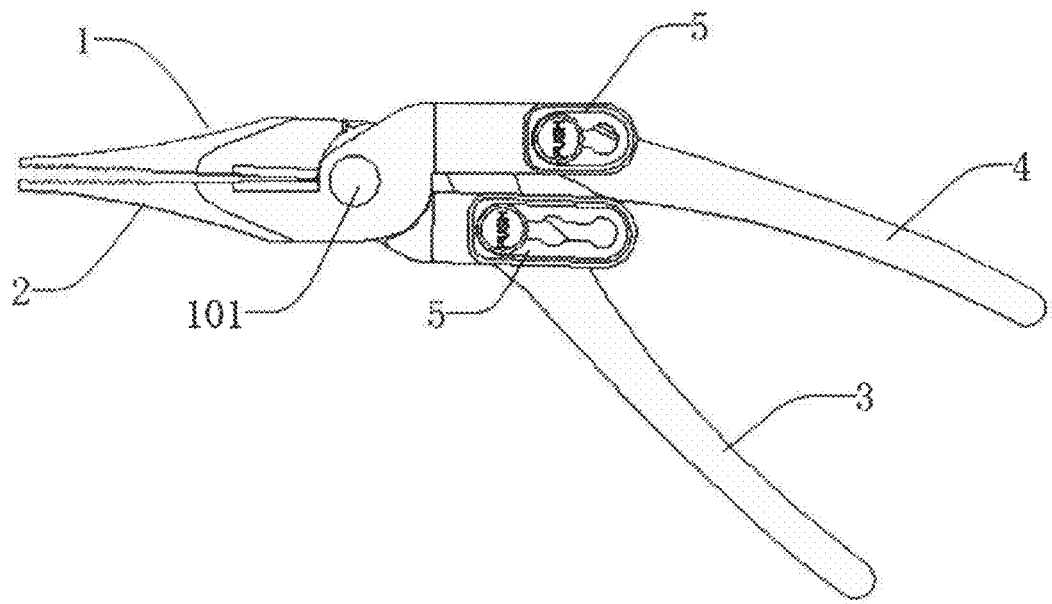
FIG. 9 is a front structural schematic diagram of the second embodiment of the present invention.

As shown in FIG. 9, the open-close device according to the second embodiment has a technical solution mostly the same as the technical solution of the first embodiment, with the different technical feature that in the second embodiment, no third axle pin is provided at the joint between the fourth member 4 and the second member 2, but another angle adjusting device is provided for adjusting the bending angle of the fourth member 4 with respect to the second member 2.

The two angle adjusting devices have same or similar structures, being the two-gear angle adjusting device or the multi-gear angle adjusting device in the first embodiment. The details of the specific structure and operating method are described as above, and are not repeated here.

Compared with the first embodiment, the second embodiment 2 can directly adjust the bending angle of the third member 3 with respect to the first member 1, and can directly adjust the bending angle of the fourth member 4 with respect to the second member 2.

During use of the present embodiment, the user can adjust the bending angle of the third member 3 and the fourth member 4 as appropriate once or more than once, such that the bending angle is greater, and the whole length is shorter, so as to realize the application in narrower operation spaces, and wider serviceable ranges.

Third Embodiment

The open-close device according to the third embodiment has a technical solution mostly the same as that of the first embodiment. At the joint between the third member 3 and the first member 1, one angle adjusting device 5 is provided; and at the joint between the fourth member 4 and the second member 2, one third axle pin 103 is provided.

As shown in FIGS. 10-15, the third embodiment differs from the first embodiment in that the angle adjusting device 5 does not include the compression spring 53, but an elastic sheet 54, one end of which is fixedly connected to the third member 3, and the other end is attached to the surface of the gear shaft base 512, or fixedly connected to the gear shaft base 512.

The elastic sheet 54 includes an elastic sheet fixed portion 541, an elastic sheet pressure portion 542 and an elastic sheet bending portion 543. The elastic sheet fixed portion 541 is fixedly connected to the first handheld portion 31 by a rivet 104; the elastic sheet pressure portion 542 is tangent to the surface of the gear shaft base 512, or fixedly connected to the gear shaft base 512; one end of the elastic sheet bending portion 543 is connected to the elastic sheet fixed portion 541, and the other end is connected to the elastic sheet pressure portion 542.

Figure 10:
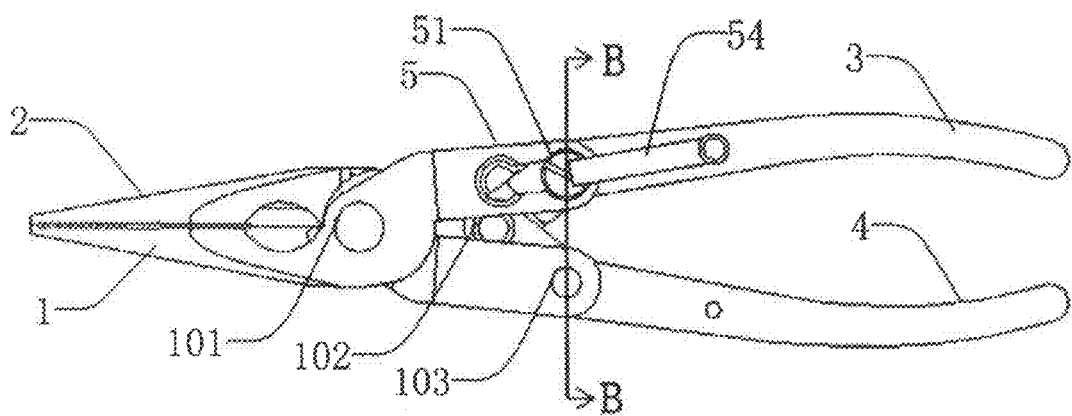
FIG. 10 is a back structural schematic diagram of the third embodiment of the present invention.
Figure 11:
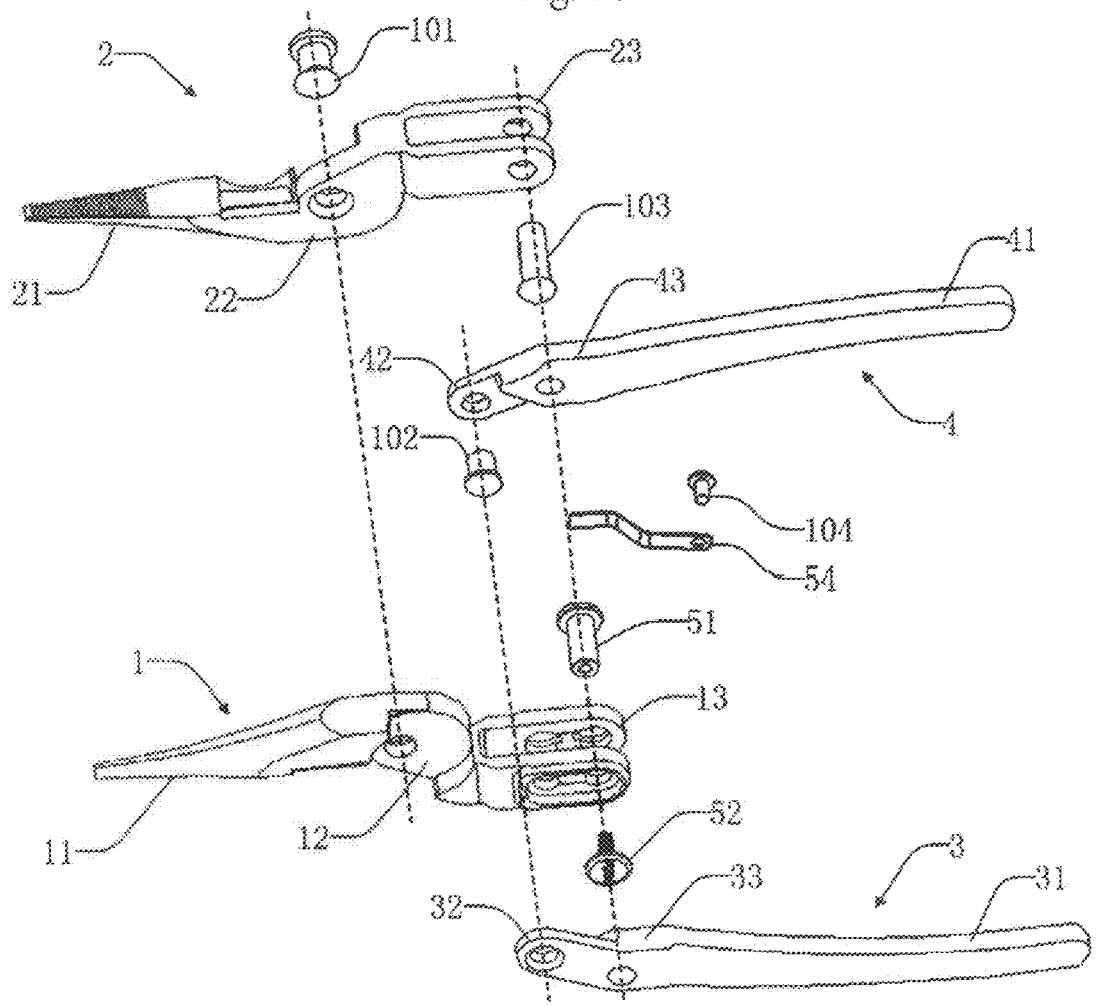
FIG. 11 is an exploded structural schematic diagram of the third embodiment of the present invention.
Figure 12:
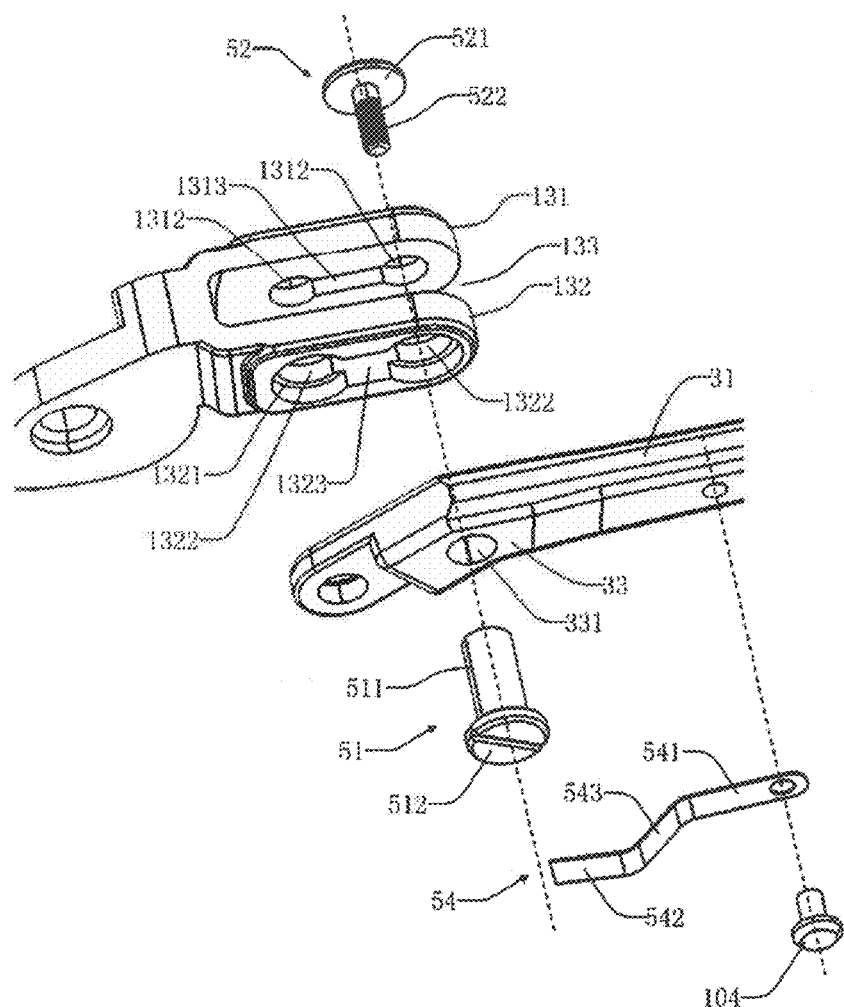
FIG. 12 is an exploded structural schematic diagram of the angle adjusting device in the third embodiment of the present invention.
Figure 13:
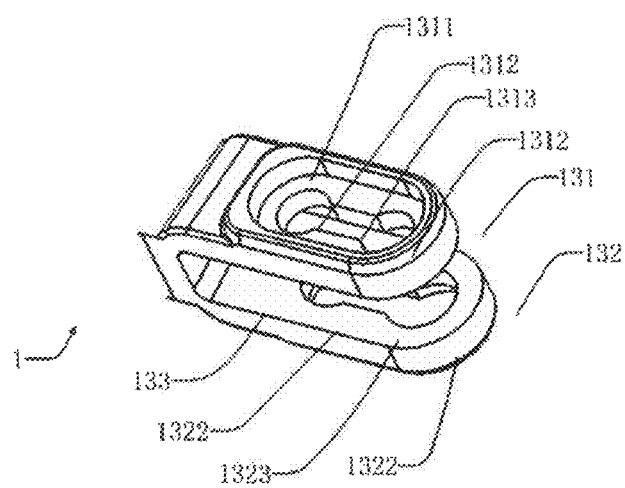
FIG. 13 is a back structural schematic diagram of the first gear shifting portion in the third embodiment of the present invention.
Figure 14:
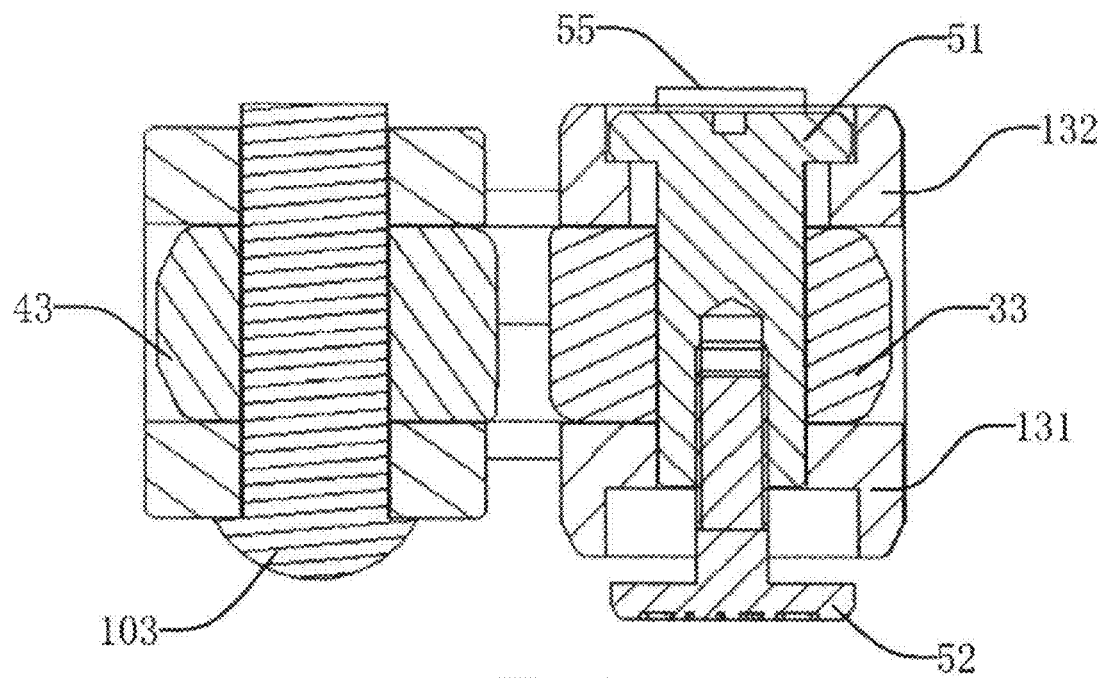
FIG. 14 is a sectional view of the press key in a released state taken along BB in FIG. 10.

As shown in FIGS. 10 and 14, in a normal state, when the angle adjusting device 5 is located in the first gear, the press plate 521 is supported by the elastic sheet 54, and is located outside the first gear slot 1311; the gear shaft base 512 is engaged into the second gear slot 1321 in the first gear, and the lower surface of the gear shaft base 512 aligns with the lower surface of the second clamping plate 132. Since the width of the gear shaft lever 511 is greater than that of the first communicating hole 1313, the gear shaft lever 511 is locked by the first gear hole 1312 in the first gear.

Figure 15:
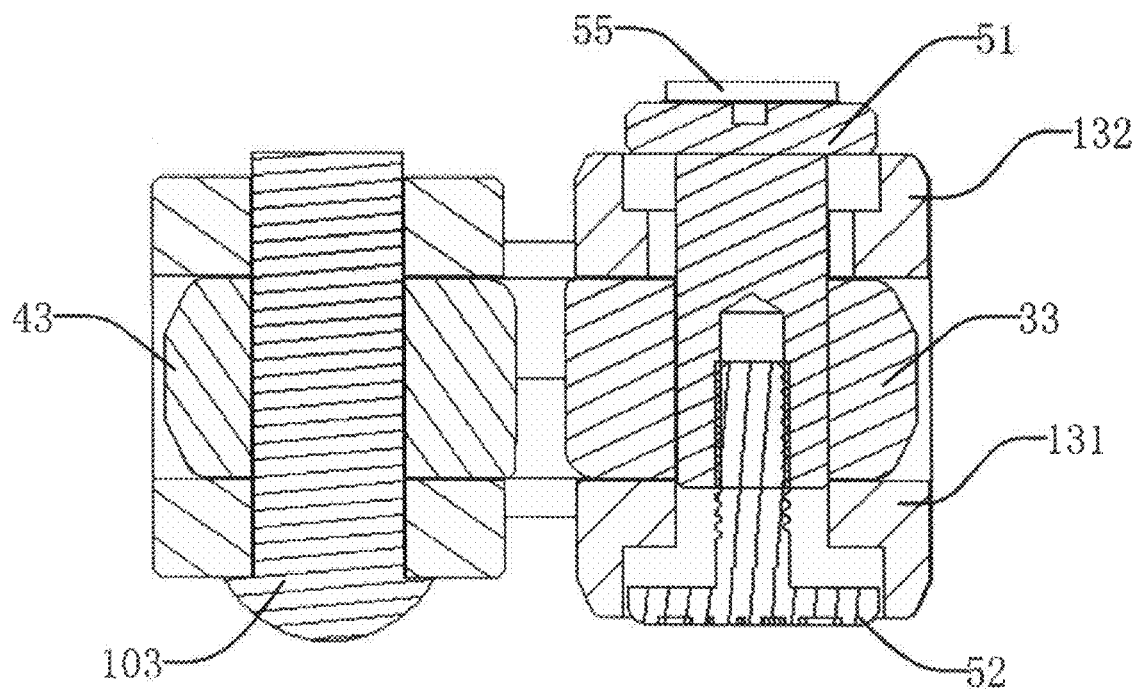
FIG. 15 is a sectional view of the press key in a pressed state taken along BB in FIG. 10.

As shown in FIG. 15, when the press plate 521 is pressed downwards, the elastic sheet 54 is deformed, the press plate 521 is engaged into the first gear slot 1311, the gear shaft base 512 disengages from the second gear slot 1321, and the gear shaft lever 511 slides downwards to disengage from the lock by the first gear hole 1312. Since the width of the gear shaft lever 511 is less than that of the second communicating hole 1323, the width of the press screw 522 is less than that of the first communicating hole 1313. After being unlocked, the gear shaft 51 can slide through the first communicating hole 1313 and the second communicating hole 1323.

When the press plate 521 is stressed and slides, the gear shaft 51 slides from the first gear to the second gear, and the third member 3 is bent greatly with respect to the first member 1. Since the upper end of the fourth member 4 is rotatably connected to the upper end of the third member 3 by the second axle pin 102, the fourth member 4 less bends with respect to the second member 2. The third member 3 and the fourth member 4 both bend towards the same side.

When the press plate 521 is released, the elastic sheet 54 resiles, and the press plate 521 is supported by the elastic sheet 54, and disengages from the first gear slot 1311. The gear shaft base 512 is engaged into the second gear slot 1321, and the lower surface of the gear shaft base 512 aligns with the lower surface of the second clamping plate 132. At this point, the gear shaft lever 511 is located in the second gear; since the width of the gear shaft lever 511 is greater than that of the first communicating hole 1313, the gear shaft lever 511 is locked by the first gear hole 1312 in the second gear. At this point, the two clamping portions of the open-close device are in a closed state, with handheld portions bent, the length of which is effectively shortened.

Then, the user opens the first handheld portion 31 and the second handheld portion 41 of the open-close device as appropriate. The first clamping portion 11 and the second clamping portion 21 are also opened, for clamping or cutting objects. When the open-close device is opened, its length is further shortened, for being applied in narrow operation spaces.

When the user uses the open-close device according to the present embodiment to clamp or cut objects, the two handheld portions are closed firstly, and then the press plate 521 is pressed again, or the two handheld portions are closed after the press plate 521 is pressed.

When the press plate 521 is pressed downwards, the elastic sheet 54 is deformed, and the gear shaft lever 511 slides downwards to disengage from the lock by the first gear hole 1312 in the second gear. Since the width of the gear shaft lever 511 is less than that of the second communicating hole 1323, the width of the press screw 522 is less than that of the first communicating hole 1313. After being unlocked, the gear shaft 51 can slide to the first gear through the first communicating hole 1313 and the second communicating hole 1323.

When the press plate 521 is released, the elastic sheet 54 resiles, and the press plate 521 is supported by the compression spring 53, and disengages from the first gear slot 1311. The gear shaft base 512 is engaged into the second gear slot 1321, and the lower surface of the gear shaft base 512 aligns with the lower surface of the second clamping plate 132. At this point, since the width of the gear shaft lever 511 is greater than that of the first communicating hole 1313, the gear shaft lever 511 is locked by the first gear hole 1312 in the first gear.

The gear shaft base 512 is engaged into the second gear slot 1321, and the lower surface of the gear shaft base 512 aligns with the lower surface of the second clamping plate 132. At this point, the gear shaft lever 511 is located in the second gear; since the width of the gear shaft lever 511 is greater than that of the first communicating hole 1313, the gear shaft lever 511 is locked by the first gear hole 1312 in the second gear.

In the third embodiment, the angle adjusting device 5 can also be a multi-gear angle adjusting device with more than three gears. Both of the multi-gear angle adjusting device and the foregoing two-gear angle adjusting device can directly adjust the bending angle of the third member 3 with respect to the first member 1, while they can drive the fourth member 4 to bend with respect to the second member 2. In contrast, during use of the multi-gear open-close device, the user can adjust the bending angle of the third member 3 with respect to the first member 1 as appropriate many times, such that the bending angle is greater, and the whole length is shorter, so as to realize the application in narrower operation spaces.

In the open-close device according to the third embodiment, another angle adjusting device can be provided at the joint between the fourth member 4 and the second member 2, for adjusting the bending angle of the fourth member 4 with respect to the second member 2. The two angle adjusting devices have same or similar structures, being the two-gear angle adjusting device or the multi-gear angle adjusting device stated above in the third embodiment. The details of the specific structure and operating method are described as above, and are not repeated here.

In the third embodiment, two angle adjusting devices 5 are provided, which can not only directly adjust the bending angle of the third member 3 with respect to the first member 1, but also directly adjust the bending angle of the fourth member 4 with respect to the second member 2.

During use of the present embodiment, the user can adjust the bending angle of the third member 3 and the fourth member 4 as appropriate once or more than once, such that the bending angle is greater, and the whole length is shorter, so as to realize the application in narrower operation spaces, and wider serviceable ranges.

Fourth Embodiment

The open-close device according to the fourth embodiment has a technical solution mostly the same as that of the first embodiment. At the joint between the third member 3 and the first member 1, one angle adjusting device 5 is provided; and at the joint between the fourth member 4 and the second member 2, one third axle pin 103 is provided.

As shown in FIGS. 16-20, the fourth embodiment differs from the first embodiment in the technical feature that the angle adjusting device 5 does not include the press key 52 or the compression spring 53, but includes the gear shaft 51 and the rotating key 55; the rotating key 55 is fixedly connected to the gear shaft 51. The gear shaft 51 includes the gear shaft lever 511, the gear shaft base 512 and the rotating key mounting slot 514, instead of the gear shaft threaded groove 513.

The first clamping plate 131 is provided with two or more third gear holes 1315 and at least one third communicating hole 1316, and the third gear hole 1315 penetrates through the first clamping plate 131; the third communicating hole 1316 penetrates through the first clamping plate 131, and communicates with the two adjacent third gear holes 1315.

Figure 19:
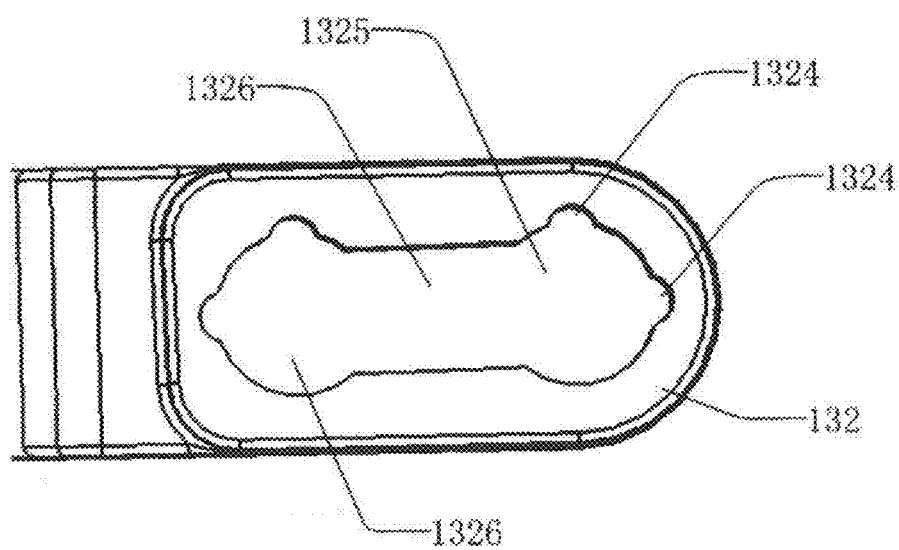
FIG. 19 is a back structural schematic diagram of the first gear shifting portion in the fourth embodiment of the present invention.
Figure 20:
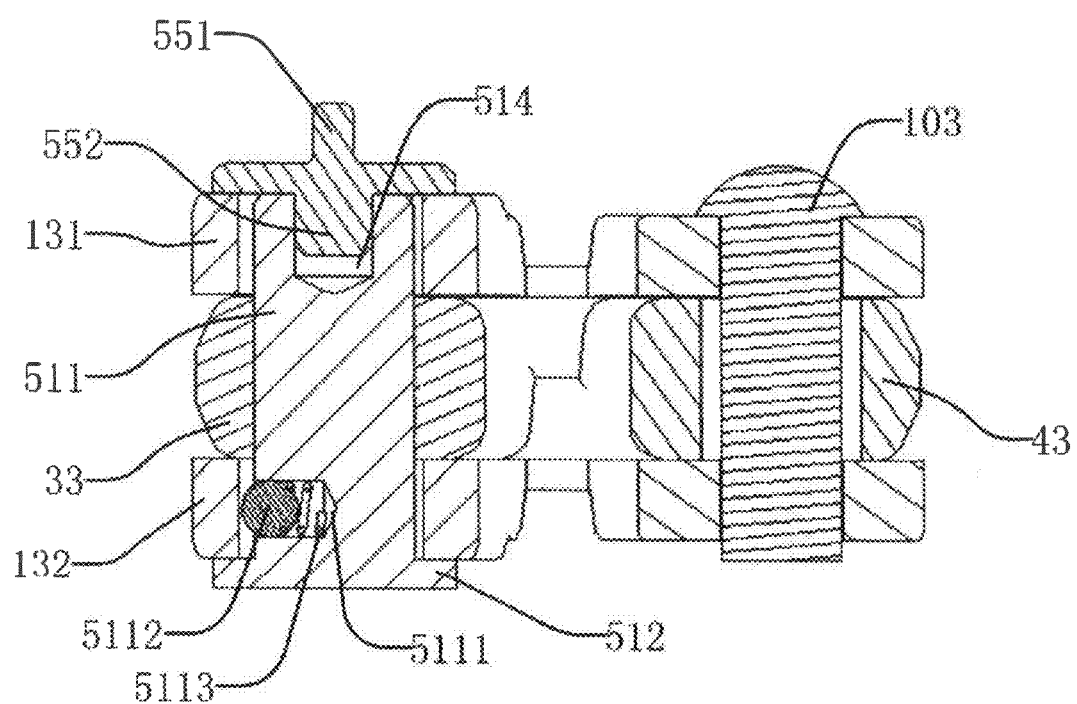
FIG. 20 is a sectional view taken along CC in FIG. 16.

The second clamping plate 132 is provided with two or more fourth gear holes 1325 and at least one fourth communicating hole 1326. The fourth gear hole 1325 penetrates through the second clamping plate 132, and each fourth gear hole 1325 respectively corresponding to one third gear hole 1315; the fourth communicating hole 1326 penetrates through the second clamping plate 132, and communicates with two or more fourth gear holes 1325. The fourth gear hole 1325 is provided with two or more positioning notches 1324 at its inside wall, preferably, as shown in FIG. 19, the two positioning notches 1324 are provided at a quartering point of the fourth gear hole 1325.

The third gear shifting portion 33 is provided with a gear shaft hole 331, corresponding to the third gear hole 1315 and the fourth gear hole 1325. The gear shaft 51 is successively inserted into the fourth gear hole 1325, the gear shaft hole 331 and the third gear hole 1315.

The gear shaft base 512 is provided at one end of the gear shaft lever 511, and is attached to the outer surface of the second clamping plate 132; the rotating key mounting slot 514 is recessed into the surface of the other end of the gear shaft lever 511.

The rotating key 55 includes a knob 551 and a rotating key mounting stem 552. The knob 551 is attached to the outer surface of the first clamping plate 131; the rotating key mounting stem 552 is fixedly mounted into the rotating key mounting slot 514.

The gear shaft lever 511 includes a positioning slot 5111 recessed into the side wall of the gear shaft lever 511, the positioning slot 5111 corresponding to the position of the second clamping plate 132.

The positioning slot 5111 is successively therein outside-in provided with a positioning ball 5112 and a positioning spring 5113. The positioning ball 5112 is engaged into one positioning notch 1324; one end of the positioning spring 5113 is tangent to the positioning ball 5112, and the other end is tangent to the bottom of the positioning slot 5111.

The gear shaft lever 511 is a cylinder with one tangent plane at two sides. Its cross section has a waist shape which refers to the shape of a circle with two symmetric arcs removed. The waist shape has a long axis and a short axis. The long axis is the diameter of the circle, and is the width of the widest part of the gear shaft lever 511; the short axis is the width of the gear shaft lever 511 with the two arcs removed, and is the width of the narrowest part of the gear shaft lever 511. The third gear hole 1315 has the same diameter as the fourth gear hole 1325. The third communicating hole 1316 has the same width as the fourth communicating hole 1326. The width of the widest part of the gear shaft lever 511 corresponds to the diameter of the third gear hole 1312 and the fourth gear hole 1322, and is slightly less than the two gear holes. The widest part of the gear shaft lever 511 can be engaged into the third gear hole 1312 and the fourth gear hole 1322; the width of the narrowest part of the gear shaft lever 511 corresponds to the width of the third communicating hole 1316 and the fourth communicating hole 1326, and is slightly less than the two communicating holes. The narrowest part of the gear shaft lever 511 can penetrate through the third communicating hole 1316 and the fourth communicating hole 1326.

Figure 16:
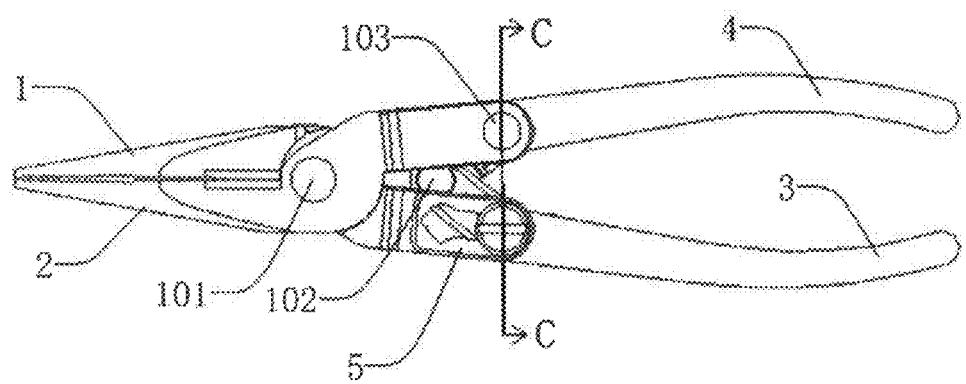
FIG. 16 is a front structural schematic diagram of the fourth embodiment of the present invention.
Figure 17:
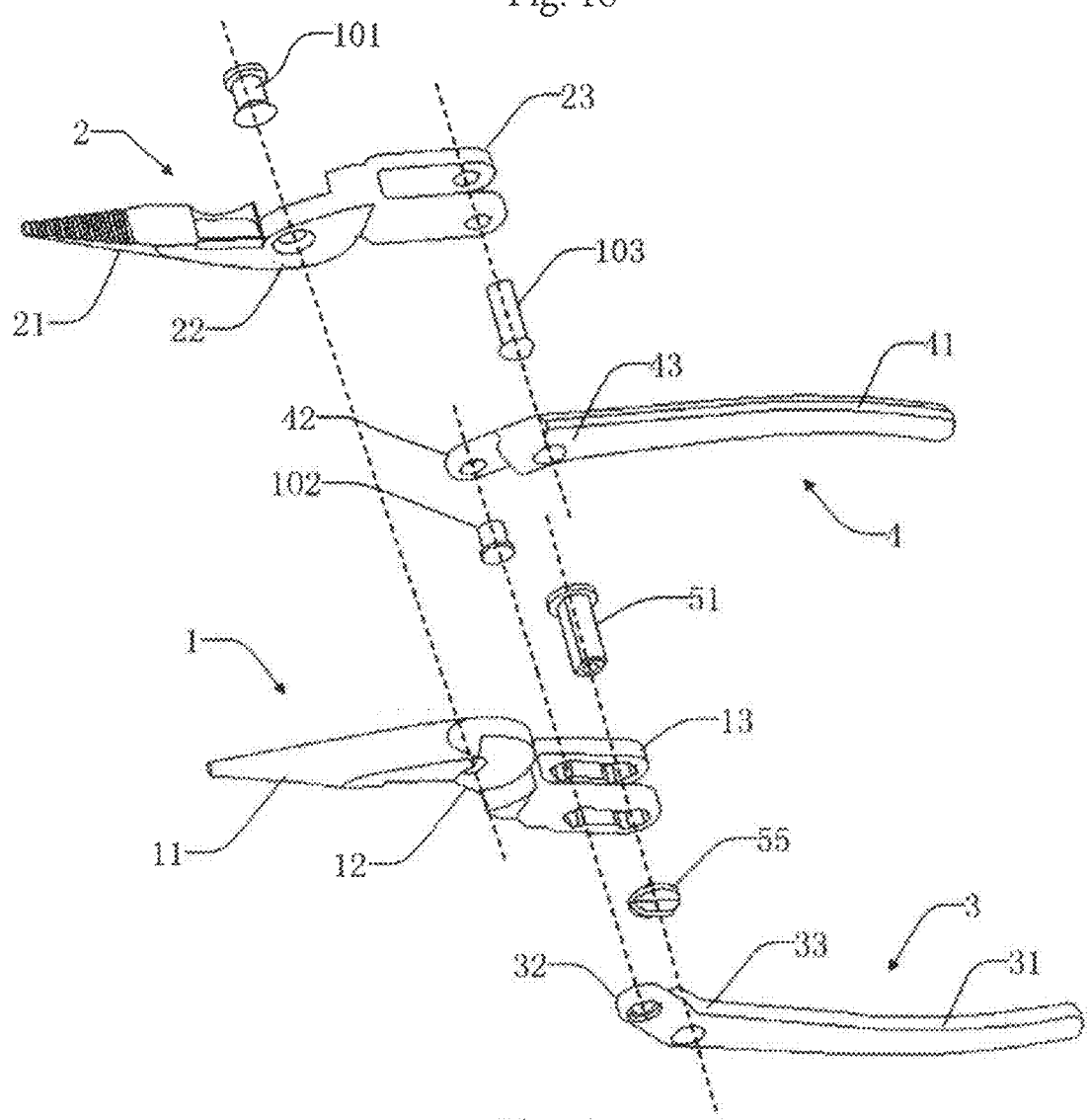
FIG. 17 is an exploded structural schematic diagram of the fourth embodiment of the present invention.
Figure 18:
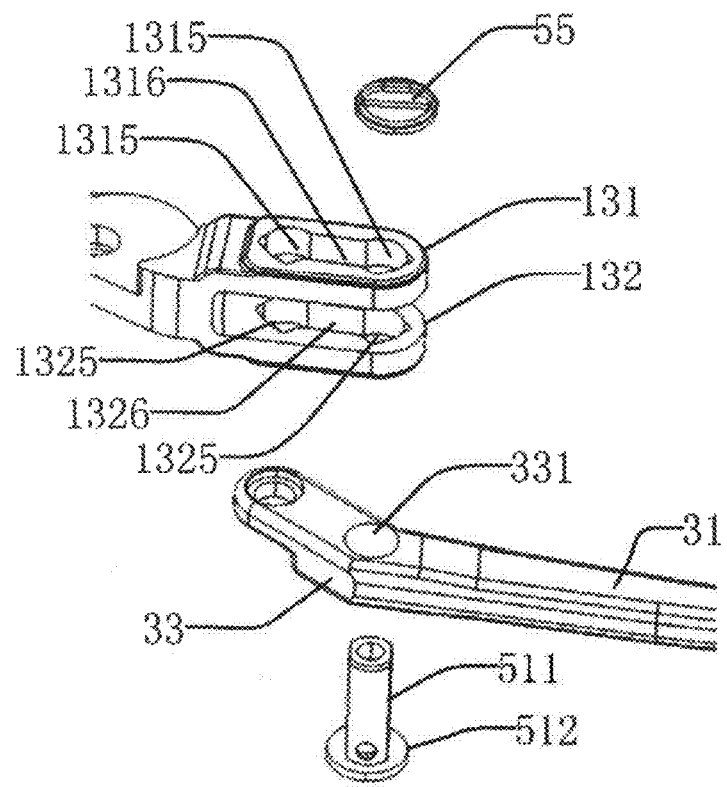
FIG. 18 is an exploded structural schematic diagram of the angle adjusting device in the fourth embodiment of the present invention.

As shown in FIGS. 16 and 19, in a normal state, the angle adjusting device 5 is located in the first gear, and the positioning ball 5112 is engaged into one positioning notch 1324. At this point, one tangent plane of the gear shaft lever 511 is dead against the third communicating hole 1316 and the fourth communicating hole 1326. The widest part of the gear shaft lever 511 is engaged into the third gear hole 1315 and the fourth gear hole 1325, and the gear shaft lever 511 is locked in the first gear.

After the rotating key 55 is rotated by 90 degrees, the positioning ball 5112 is engaged into one positioning notch 1324. The two tangent planes of the gear shaft lever 511 are dead against the side walls of the third gear hole 1315 and the fourth gear hole 1325. The narrowest part of the gear shaft lever 511 is dead against the third communicating hole 1316 and the fourth communicating hole 1326. After being unlocked, the gear shaft 51 can slide through the third communicating hole 1316 and the fourth communicating hole 1326.

When the rotating key 55 is stressed and slides, the gear shaft 51 slides from the first gear to the second gear, and the third member 3 is bent greatly with respect to the first member 1. Since the upper end of the fourth member 4 is rotatably connected to the upper end of the third member 3 by the second axle pin 102, the fourth member 4 less bends with respect to the second member 2. The third member 3 and the fourth member 4 both bend towards the same side.

After the rotating key 55 is rotated by 90 degrees again, the positioning ball 5112 is engaged into one positioning notch 1324. At this point, one tangent plane of the gear shaft lever 511 is dead against the third communicating hole 1316 and the fourth communicating hole 1326. The widest part of the gear shaft lever 511 is engaged into the third gear hole 1315 and the fourth gear hole 1325, and the gear shaft lever 511 is locked in the second gear. At this point, the two clamping portions of the open-close device are in a closed state, with handheld portions bent, the length of which is effectively shortened.

Then, the user opens the first handheld portion 31 and the second handheld portion 41 of the open-close device as appropriate. The first clamping portion 11 and the second clamping portion 21 are also opened, for clamping or cutting objects. When the open-close device is opened, its length is further shortened, for being applied in narrow operation spaces.

When the user uses the open-close device according to the present embodiment to clamp or cut objects, the two handheld portions are closed firstly, and then the gear shaft 51 is pushed back to the first gear again, or the two handheld portions are closed after the gear shaft 51 is pushed back to the first gear.

The process of pushing the gear shaft 51 back to the first gear includes rotating the rotating key 55 by 90 degrees in the second gear and unlocking, pushing the gear shaft lever 511 back to the first gear from the second gear, and rotating the rotating key 55 by 90 degrees in the first gear and relocking. The operating process and the operating principle are similar to the process of pushing the gear shaft 51 from the first gear to the second gear.

In the fourth embodiment, the angle adjusting device 5 can also be a multi-gear angle adjusting device with more than three gears. Both of the multi-gear angle adjusting device and the foregoing two-gear angle adjusting device can directly adjust the bending angle of the third member 3 with respect to the first member 1, while they can drive the fourth member 4 to bend with respect to the second member 2. In contrast, during use of the multi-gear open-close device, the user can adjust the bending angle of the third member 3 with respect to the first member 1 as appropriate many times, such that the bending angle is greater, and the whole length is shorter, so as to realize the application in narrower operation spaces.

In the open-close device according to the fourth embodiment, another angle adjusting device can be provided at the joint between the fourth member 4 and the second member 2, for adjusting the bending angle of the fourth member 4 with respect to the second member 2. The two angle adjusting devices have same or similar structures, being the two-gear angle adjusting device or the multi-gear angle adjusting device stated above in the fourth embodiment. The details of the specific structure and operating method are described as above, and are not repeated here.

In the fourth embodiment, two angle adjusting devices 5 are provided, which can not only directly adjust the bending angle of the third member 3 with respect to the first member 1, but also directly adjust the bending angle of the fourth member 4 with respect to the second member 2. During use of the present embodiment, the user can adjust the bending angle of the third member 3 and the fourth member 4 as appropriate once or more than once, such that the bending angle is greater, and the whole length is shorter, so as to realize the application in narrower operation spaces, and wider serviceable ranges.

The present invention has the advantages that an open-close device is provided, the bending angle of the handheld portion(s) at one side or two sides with respect to the clamping portion can be freely adjusted as appropriate. The open-close device has the labor-saving effects at the same time. In the present invention, the free gear shifting can be realized by operating the angle adjusting device, such that the bending angle of the handheld portion(s) at one or two sides can be adjusted by the user himself or herself, so that the labor-saving open-close device can be widely used and is suitable for large-scale application. The present invention can effectively solve the technical problems in the prior labor-saving open-close device of only being applicable to conventional situations (i.e., inconvenient use in narrow spaces) and inconvenient adjustment of the bending angle of the handheld portions.

The above are only the preferable embodiments of the present invention. It is to be pointed out that for persons skilled in the art, without departing from the principle of the present invention, several improvements and polishment which can be further made shall be taken within the protection scope of the present invention.

The invention claimed is:

1. An open-close device, comprising:
   a first member;
   a second member, rotatably connected to the first member;
   a third member, rotatably connected to the first member; and
   a fourth member, rotatably connected to the second member and rotatably connected to the third member;
   wherein the open-close device comprises:
      an angle adjusting device which is provided at a joint between the third member and the first member, for adjusting the bending angle of the third member with respect to the first member;
      a third axle pin provided at a joint between the fourth member and the second member, wherein the angle adjusting device comprises a first gear shifting portion and a third gear shifting portion, the first gear shifting portion comprising a first clamping plate and a second clamping plate arranged so that a clamping plate gap is formed between the first clamping plate and the second clamping plate, and the third gear shifting portion is inserted to the clamping plate gap;
      wherein the first clamping plate comprising:
         a first gear slot recessed into an outer surface of the first clamping plate;
         two or more first gear holes penetrating through the bottom of the first gear slot and at least one first communicating hole penetrating through the bottom of the first gear slot to communicate the two or more first gear holes;
         the second clamping plate comprising:
         a second gear slot recessed into an outer surface of the second clamping plate;
         two or more second gear holes penetrating through the bottom of the second gear slot, each second gear hole respectively corresponding to one first gear hole; and
         at least one second communicating hole penetrating through the bottom of the second gear slot to communicate the two or more second gear holes, wherein the third gear shifting portion comprises gear axle holes corresponding to the first gear hole and the second gear hole.

2. The open-close device according to claim 1, wherein the first member successively comprises a first clamping portion, a first rotating portion and a first gear shifting portion;
   the second member successively comprises
   a second clamping portion disposed opposite to the first clamping portion;
   a second rotating portion which is rotatably connected to the first rotating portion by a first axle pin; and
   a second gear shifting portion disposed opposite to the first gear shifting portion.

3. The open-close device according to claim 1, wherein the third member successively comprises a first handheld portion, a third gear shifting portion and a third rotating portion;
   the fourth member successively comprises
   a second handheld portion disposed opposite to the first handheld portion;
   a fourth gear shifting portion disposed opposite to the third gear shifting portion; and
   a fourth rotating portion which is rotatably connected to the third rotating portion by a second axle pin.

4. The open-close device according to claim 1, further comprising:
   another angle adjusting device which is provided at the joint between the fourth member and the second member, for adjusting the bending angle of the fourth member with respect to the second member.

5. The open-close device according to claim 4, wherein the angle adjusting device comprises a first gear shifting portion and a third gear shifting portion, or, comprises a second gear shifting portion and a fourth gear shifting portion;
   the first gear shifting portion or the second gear shifting portion comprises a first clamping plate and a second clamping plate;
   a clamping plate gap is formed between the first clamping plate and the second clamping plate;
   the third gear shifting portion or the fourth gear shifting portion is inserted to the clamping plate gap.

6. The open-close device according to claim 1, wherein the angle adjusting device further comprises:
   a gear shaft, successively inserted into the second gear hole, the gear axle hole and the first gear hole; and
   a press key fixedly connected to the gear shaft.

7. The open-close device according to claim 6, wherein the gear shaft comprises:
   a gear shaft lever;
   a gear shaft base provided at one end of the gear shaft lever, corresponding to the second gear slot; and
   a gear shaft threaded groove recessed into the surface of the other end of the gear shaft lever;
   the press key comprises:
      a press plate corresponding to the first gear slot; and
      a press screw protruding from the surface of the press plate, and in threaded connection to the gear shaft threaded groove.

8. The open-close device according to claim 7, wherein
   a width of the gear shaft lever is greater than that of the first communicating hole; and less than that of the second communicating hole;
   a width of the press screw is less than that of the first communicating hole.

9. The open-close device according to claim 7, wherein the angle adjusting device further comprises:
   a compression spring, one end of which is tangent to a bottom surface of the first gear slot, and the other end of which is tangent to a surface of the press plate.

10. The open-close device according to claim 7, wherein the angle adjusting device further comprises:
    an elastic sheet, one end of which is fixedly connected to the third member, and the other end of which is attached to the surface of the gear shaft base, or fixedly connected to the gear shaft base.

11. The open-close device according to claim 10, wherein the elastic sheet comprises:
    an elastic sheet fixed portion fixedly connected to the first handheld portion by rivets;
    an elastic sheet pressure portion tangent to the surface of the gear shaft base, or fixedly connected to the gear shaft base; and
    an elastic sheet bending portion, one end of which is connected to the elastic sheet fixed portion, and the other end of which is connected to the elastic sheet pressure portion.

12. The open-close device according to claim 1, wherein the first clamping plate is provided with:
- two or more third gear holes penetrating through the first clamping plate; and
- at least one third communicating hole penetrating through the first clamping plate and communicating two or more third gear holes;
- the second clamping plate is provided with:
  - two or more fourth gear holes penetrating through the second clamping plate, each fourth gear hole respectively corresponding to one third gear hole; and
  - at least one fourth communicating hole penetrating through the second clamping plate, to communicate two or more fourth gear holes;
  - wherein the third gear shifting portion is provided with gear shaft holes corresponding to the third gear hole and the fourth gear hole.

13. The open-close device according to claim 12, wherein the angle adjusting device further comprises:
- a gear shaft successively inserted into the fourth gear hole, the gear shaft hole and the third gear hole; and
- a rotating key fixedly connected to the gear shaft.

14. The open-close device according to claim 13, wherein the gear shaft comprises:
- a gear shaft lever;
- a gear shaft base provided at one end of the gear shaft lever and attached to the outer surface of the second clamping plate; and
- a rotating key mounting slot recessed into the surface of the other end of the gear shaft lever;

the rotating key comprises:
- a knob attached to the outer surface of the first clamping plate; and
- a rotating key mounting stem fixedly mounted into the rotating key mounting slot.

15. The open-close device according to claim 14, wherein the fourth gear hole is provided with at least one positioning notch at its inner side wall;
the gear shaft lever comprises:
- a positioning slot recessed into a side wall of the gear shaft lever and corresponding to the second clamping plate;
- the positioning slot is successively therein outside-in provided with:
  - a positioning ball engaged into one positioning notch; and
  - a positioning spring, whose one end is tangent to the positioning ball, and the other end is tangent to the bottom of the positioning slot.

16. The open-close device according to claim 15, wherein
- a cross section of the gear shaft lever has a waist shape which refers to the shape of a circle with two symmetric arcs removed;
- the width of the widest part of the gear shaft lever corresponds to the diameter of the first gear hole and the second gear hole;
- the width of the narrowest part of the gear shaft lever corresponds to the width of the first communicating hole and the second communicating hole.

17. The open-close device according to claim 1, wherein the open-close device comprises, but not limited to, scissors or pliers.

* * * * *